Figure 1:
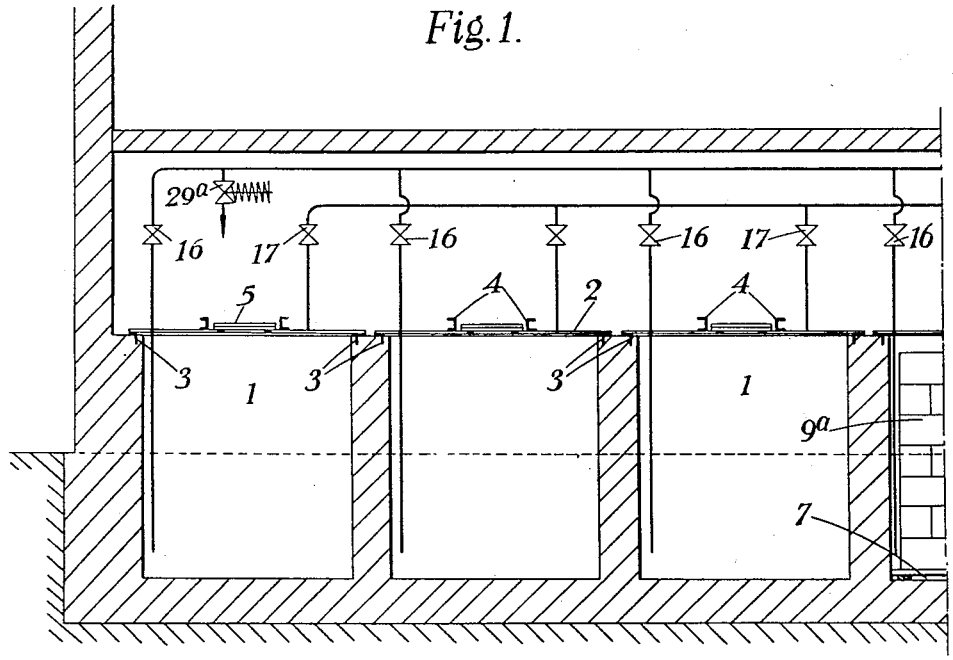
Figure 1:
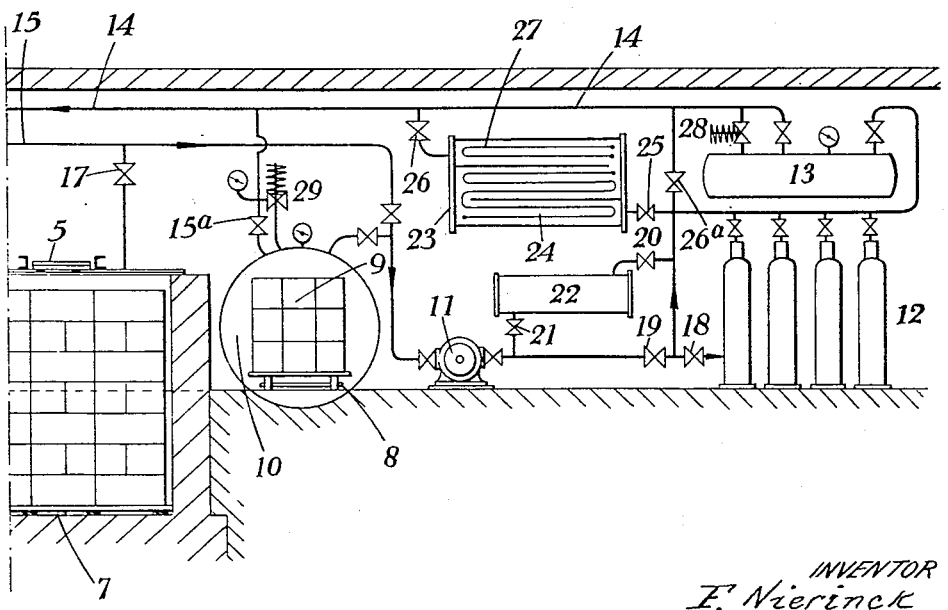

May 14, 1935  F. NIERINCK  2,001,628
METHOD FOR PRESERVING FOODSTUFFS
Filed Dec. 16, 1931  2 Sheets-Sheet 1

INVENTOR
F. Nierinck
BY
ATTORNEY

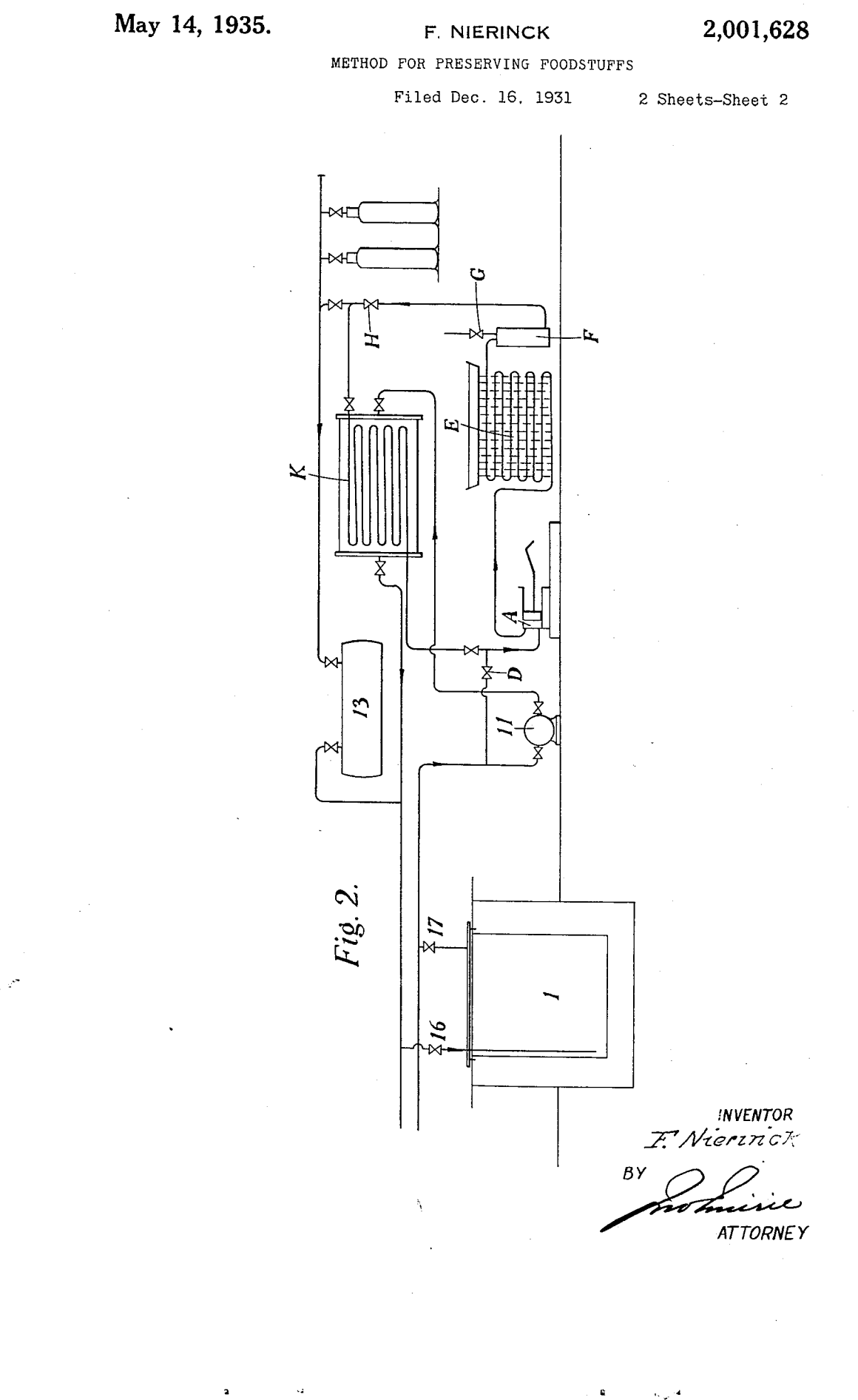

May 14, 1935.  F. NIERINCK  2,001,628

METHOD FOR PRESERVING FOODSTUFFS

Filed Dec. 16, 1931  2 Sheets-Sheet 2

Fig. 2.

INVENTOR
F. Nierinck
BY
ATTORNEY

Patented May 14, 1935

2,001,628

UNITED STATES PATENT OFFICE 2,001,628

METHOD FOR PRESERVING FOODSTUFFS

Fernand Nierinck, Riverside, Chelmsford, England, assignor to Chelmsford Egg Supply Company (1934) Limited, London, England Application December 16, 1931, Serial No. 581,480
In Denmark March 19, 1931

2 Claims. (Cl. 99—8)

This invention relates to a process for the preservation of foodstuffs in a gaseous medium. It will herein be described with reference to the storage of eggs in shell as an example, but it is not limited thereto. For instance, it may be applied to the preservation of meat, fish, fruit, vegetables or the like.

It has already previously been proposed to preserve eggs or other foodstuffs in an atmosphere of inert gas.

The present invention has for its object to provide a method suitable for being carried out in apparatus capable of being employed with storage chambers which may be improvised from existing structures without entailing the use of expensive vacuumizing apparatus which becomes very uneconomical in case a given chamber is of large size. It further provides a cheap and efficient method for replacing a volume of air by a volume of inert gas in any desired storage chamber and provides for automatically regulating the quantity of gas in the storage chamber according to atmospheric pressure.

According to the invention, I withdraw air from a chamber simultaneously with the admission of gas thereto. At first only air will be withdrawn but latterly an admixture of gas will be withdrawn with the remaining air. The mixed gas and air are then passed through a separating plant (usually in a bye-pass to the main system) whereby the desirable and undesirable constituents are separated. In one form of construction, since it is only the oxygen content of air which is detriment to the preservation of foodstuffs and not the nitrogen content, as soon as the admixture of gas with the withdrawn air becomes appreciable, it is sufficient to circulate the remaining gas and air through an oxygen-absorbing medium. Alternatively, the mixture may be passed through a compressing and cooling plant whereby a single desirable constituent e. g. $CO_2$ is separated by a process of liquefaction, the undesirable gases being left to escape.

I preferably also provide an autoclave for initially subjecting the foodstuffs to gas, the autoclave being operable from the air-evacuating and gas-supplying apparatus of the main system. As the autoclave is small I propose to vacuumize it before admitting the gas thereto in the usual known manner since the expense of this course is not prohibitive. In the main system, gas heating and/or cooling means are provided for use in heating or cooling the circulating gas when desired; and preferably barostatic means are also provided to control the pressure of gas within the system.

The invention is illustrated in the accompanying drawings in which a lay-out is shown, by way of example, comprising a series of concrete tanks such as those hitherto used in the preservation of eggs in pickle, which are now adapted for the storage of eggs in gas, and are shown in sectional elevation. Fig. 1 illustrating the first modification, and Fig. 2 the second modification referred to above.

Referring now to Fig. 1, I illustrates a plurality of concrete tanks as hitherto used for pickled eggs which are now adapted and treated to form gas-tight chambers, by fitting a light steel plate 2 over the tops of the tanks by means of stiffening angle irons 3 cemented into the tank walls. Plate 2 is suitably strengthened by cross irons 4 and is provided with a lid or door 5 which by bolts or the like can be closed in a gas-tight manner over an opening through which boxes or containers holding eggs are introduced.

As the building or constructional material of which preserving tanks are usually made e. g. concrete, is permeable to gas such as carbon dioxide, nitrogen, etc., used as preservative medium for eggs, the walls of the tanks or chambers I are therefore coated with a layer of vaseline, plastic paraffin wax or the like, which substances are not permeable to said gas. The impermeable coating can be protected from damage by fitting slatted reinforcements over the walls and floor.

The shell-eggs in boxes or containers 9 or on trays placed on a trolley 8 are wheeled into a vacuum chamber or autoclave 10 for initial treatment. The autoclave is closed and a vacuum is created therein by means of pump 11 for the purpose of withdrawing the oxygen from the air chamber of the eggs and the oxygen which is dissolved in the liquid of the eggs. The required gas mixture is supplied from gas cylinders 12 and stored in reservoir 13 at a controlled pressure. The gas mixture is introduced into the autoclave, after the subjection of the eggs to vacuum is completed, through pipe 14 and valve 15a. The eggs are kept in the gas mixture under pressure for a short time to allow the gas to diffuse through the shell and into the liquid of the eggs. The autoclave is then opened, the trolley with egg cases 9 removed, and the cases, e. g. indicated by 9a are stacked in the storage chambers I.

It may take two or three charges of autoclave 9 to fill a tank 1 with egg boxes, or two or three autoclaves may be used holding altogether as many egg cases as a tank 1.

After treatment in the autoclave, diffusion of gas from the eggs through the shell is very slow, and the time taken to fill a chamber is sufficiently short that the temporary exposure to air during transportation will not be detrimental to the subsequent storage.

Each chamber 1 is provided with flow and return pipes coupled to mains 14, 15, and controlled by valves 16, 17 respectively. The main 15 is connected to the intake side of pump 11 and thence through a control valve 19 to the exhaust valve 18. Between the said valves 18, 19 a conduit controlled by valve 26a leads to the main 14. The bye-pass conduit system for the separation of an undesirable gas is arranged to cut off valve 19 and comprises a chamber 22 having inlet and outlet conduits controlled by separate valves 21, 20. 23 is a chamber housing a cooling apparatus 27 and a heating apparatus 24 for alternative use. It is connected to the main 14 through a valve 26 and is adapted to receive gas from chamber 13 through an inlet conduit controlled by a valve 25. Chamber 13 is connected to main 14 by a pair of conduits, one for normal control and the other controlled by an aneroid-operated valve 28 which is adapted to open and admit a further supply of gas from the chamber 13 to the main 14 when the pressure in main 14 falls unduly below atmospheric pressure. The outlet connection from autoclave 10 to main 14 is also controlled by an ordinary valve 15a and a barostatic valve 29 admitting gas to the autoclave should the pressure therein fall below a certain point. In use, the apparatus is operated as follows:—

The gas or gas mixture from reservoir 13 is admitted into the first tank 1 through main pipe 14 and valve 16. Valve 17 is opened and pump 11 simultaneously removes the air from the tank and delivers it into the open through valve 18. After a short time the mixture drawn by the pump 11 becomes sufficiently highly charged with gas to make its recovery or preservation economically desirable; valves 18 and 19 are closed and valves 20 and 21 are opened. The mixture delivered by pump 11 is then bye-passed through vessel 22 which contains an oxygen-absorbing material. The oxygen free gas mixture including the residual nitrogen from the air is then re-circulated through pipe 14 and valve 16 into tank 1 and the circulation is continued through absorber 22 until the atmosphere surrounding the eggs in tank 1 is free of oxygen.

Other tanks 1 are filled in turn in the same manner.

At intervals when required during the period of storage, pump 11 will be used to circulate the preserving gas mixture through chamber 23 utilizing a cooler 24 by opening valves 25 and 26 and closing valve 26a. The eggs would thus be kept at a temperature considered to be the most suitable according to the proposed length of storage. Alternatively, and more particularly at the end of the storage season, the gas is circulated through chamber 23 and warmed by heater 27 until the eggs are raised to the same temperature as the outside air. When the eggs are then removed from tanks 1 through opening 5 they will not sweat owing to the deposit of moisture on too cold shells.

During the period of storage the barometric pressure of the outside atmosphere may fluctuate. To equalize the gas pressure inside tanks 1, a valve 28, which is spring-loaded or aneroid-operated is fitted, connecting reservoir 13 to gas supply main pipe 14, and which opens when the gas pressure in tanks 1 would tend to fall, allowing gas from reservoir 13 to flow into tanks 1 and thus equalizing the inside and outside pressure. A similar valve 29a is fitted to a branch of supply pipe 14, valve 29a being aneroid-controlled, but the valve being fitted so as to open when the gas pressure in tanks 1 rises above the outside atmospheric pressure, letting a small quantity of gas escape.

The invention includes the modification of the above process in which the elimination of undesirable gases from the food storage chambers is effected by a process of liquefaction. A plant for such a process is illustrated in Fig. 2, which is a modification of the plant of Fig. 1 with this arrangement. If it is desired to have a storage atmosphere of $CO_2$ and no oxygen, compressor pump A withdraws the gas mixture from tank 1 after opening valves 17 and D. The mixture is compressed by pump A, sent through condenser tubes E and the liquid $CO_2$ collects in vessel F. By using a suitable cooling agent over the condenser, say water in this case, only the $CO_2$ is liquefied, and the non-liquefied gas, such as oxygen and nitrogen if desired will collect in the top of vessel F and is allowed to escape into the open from time to time by opening valve G. The liquid $CO_2$ passes through a pressure regulator H, and thereafter flows as oxygen-free carbon dioxide into tank 13 and back into storage chamber 1 through valve 16.

This method is applicable to other gases, and according to the gases it is proposed to retain for the food storage, multi-compression and multi-condensation can be applied, or condensation in stages, or the principle of the Pictet cascade of cycles can be applied etc.

When the storage atmosphere has reached the right composition, valve D is closed, and pump A is operated as an ordinary refrigerating machine, the cold being produced in evaporator K.

Pump 11 previously used as a vacuum pump on the autoclave as in the case of Fig. 1, will now circulate the storage gas from tanks 1 through cooler K and thus keep the foodstuffs at the required temperature, or evaporator K could take the form of cooling coils fitted inside or outside the food storage chambers.

At the end of the storage season, when it may be desirable to warm the foodstuffs before they are removed from the storage chambers, the compressor pump A can be used as a heat pump and the evaporator K can be used as heating coils by reducing the quantity of water over condenser E or short circuiting the condenser.

The forms of the invention described above are given by way of example only, and modifications may be made within the scope of the appended claims.

I claim:—

1. A method of preserving eggs which consists in placing them in an autoclave, evacuating the latter to remove the air from the eggs, replacing the evacuated air in the eggs by a preserving gas, removing the eggs through the atmosphere from the autoclave, and storing the eggs in the presence of a preserving gas at substantially atmospheric pressure, the eggs during the removal from the autoclave to the place of storage being protected from contained gas leakage solely by the inhibition of the shell of the egg to such leakage.

2. A method of preserving eggs consisting in packing them in open containers, placing the containers in an autoclave, subjecting the eggs and autoclave to a vacuum for removing the air from the eggs, subjecting the eggs while still in the autoclave to a preserving gas to replace the air withdrawn from the eggs, and finally removing the open containers from the autoclave through the atmosphere and storing them in a chamber containing a preserving gas at substantially atmospheric pressure, the movement of the eggs in the open containers from the autoclave to the storage space providing against substantial gas leakage solely through the inhibition of the egg shell to the passage of the contained gas.

FERNAND NIERINCK.